(12) United States Patent
Ballan et al.

(10) Patent No.: US 12,353,645 B2
(45) Date of Patent: Jul. 8, 2025

(54) POSE ALGORITHM FOR CONTINUOUS AR EXPERIENCES

(71) Applicant: Google LLC, Mountain View, CA (US)

(72) Inventors: Luca Ballan, San Jose, CA (US); Mahesh Ramachandran, Dublin, CA (US); Qiyue Zhang, Cupertino, CA (US); Chao Guo, San Jose, CA (US); Konstantine Nicholas John Tsotsos, Corte Madera, CA (US); Jie Zhang, Fremont, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/312,448

(22) Filed: May 4, 2023

(65) Prior Publication Data
US 2023/0359286 A1    Nov. 9, 2023

Related U.S. Application Data

(60) Provisional application No. 63/364,122, filed on May 4, 2022.

(51) Int. Cl.
*G06F 3/0346*    (2013.01)
*G06T 7/70*    (2017.01)

(52) U.S. Cl.
CPC .............. *G06F 3/0346* (2013.01); *G06T 7/70* (2017.01); *G06T 2207/20084* (2013.01)

(58) Field of Classification Search
CPC .............................. G06F 3/0346; G06T 7/70; G06T 2207/20084
See application file for complete search history.

(56) References Cited

U.S. PATENT DOCUMENTS 11,113,894 B1 * 9/2021 Price ...................... G06T 19/006
11,354,868 B1 * 6/2022 Judd ...................... G06F 3/0304
(Continued)

FOREIGN PATENT DOCUMENTS

CN    114485637 A *  5/2022
WO    2021160098 A1   8/2021

OTHER PUBLICATIONS

Chen, et al., "IONet: Learning to Cure the Curse of Drift in Inertial Odometry", arXiv:1902.02209v1, Jan. 30, 2018, 9 pages.
(Continued)

*Primary Examiner* — Kenneth B Lee, Jr.
(74) *Attorney, Agent, or Firm* — Brake Hughes Bellermann LLP

(57) ABSTRACT

A tracking system and associated algorithms are disclosed that can provide a user with a continuous, reset-free augmented reality (AR) experience. When the user wears an AR headset equipped with a camera and an inertial measurement unit (IMU), motion sensor data from the IMU can be combined with image data from the camera to create a device pose, representing a position and an orientation of the headset relative to its environment. In some implementations, when a reset occurs, a six-degrees-of-freedom (6DoF) algorithm can be configured to support the pose until a re-initialization is completed. In some implementations, a neural network can be used to correct for IMU integration drifts in the 6DoF algorithm. In some implementations, the IMU-based 6DoF uses a neural network that exploits the device's past motion to infer its future motion.

19 Claims, 13 Drawing Sheets

(56) References Cited

U.S. PATENT DOCUMENTS

| | | | | |
|---|---|---|---|---|
| 2019/0130788 A1* | 5/2019 | Seaton | .................. | G06F 3/0346 |
| 2021/0358156 A1 | 11/2021 | Price et al. | | |
| 2022/0206566 A1* | 6/2022 | Senkal | ...................... | G06T 7/70 |
| 2022/0253182 A1* | 8/2022 | Schwarz | ................. | G06F 3/167 |
| 2023/0019543 A1* | 1/2023 | Nikou | ................... | A61B 8/461 |
| 2023/0132644 A1* | 5/2023 | Melim | ................... | G06N 20/00 |
| | | | | 345/156 |

OTHER PUBLICATIONS

Liu, et al., "TLIO: Tight Learned Inertial Odometry", IEEE Robotics and Automation Letters, Jul. 10, 2020, 8 pages.

Yan, et al., "RIDI: Robust IMU Double Integration", arXiv:1712.09004v2, Dec. 31, 2017, 9 pages.

Yan, el al., "RoNIN: Robust Neural Inertial Navigation in the Wild: Benchmark, Evaluations, and New Methods", arXiv:1905.12853v1, May 30, 2019, 14 pages.

Garon, et al, "A Framework for Evaluating 6-DOF Object Trackers", arXiv:1803.10075v3, Sep. 6, 2018, 16 pages.

* cited by examiner

POSE ALGORITHM FOR CONTINUOUS AR EXPERIENCES

CROSS-REFERENCE TO RELATED APPLICATION

This patent application claims the benefit of U.S. Provisional Patent Application No. 63/364,122, filed on May 4, 2022, titled "Tracking Algorithm for AR Experiences," which is incorporated by reference herein in its entirety.

FIELD OF THE DISCLOSURE

The present disclosure relates to a tracking system for creating a continuous augmented reality experience.

BACKGROUND

Augmented reality (AR) overlays digital content onto a real-world environment to provide an immersive experience for a user. Augmented reality platforms include smart phones, head-mounted displays (HMDs) and AR glasses to which cameras and motion sensors, e.g., inertial measurement units (IMUs), can be attached. The sensors can be configured to track motion of the AR device so that a pose of the AR platform relative to the environment can be predicted.

SUMMARY

The present disclosure describes methods and systems for incorporating inertial measurement data into an IMU-based six-degrees-of-freedom (6DoF) tracking system to reduce interruptions in an immersive augmented reality experience.

In some aspects, the techniques described herein relate to a tracking system, including: an augmented reality (AR) headset; an image processor configured with a mapping algorithm to generate an image-based pose of the AR headset; an inertial measurement unit (IMU) processor communicatively coupled to the image processor, the IMU processor configured with an IMU 6-degrees-of-freedom (6DoF) algorithm to generate a measurement-based pose of the AR headset; and a fused pose provider configured to combine a first pose stream component from the image processor with a second pose stream component from the IMU processor to produce a composite pose of the AR headset.

In some aspects, the techniques described herein relate to an apparatus, including: an inertial measurement unit (IMU) integrator configured to receive measurement data from an IMU and generate a pose therefrom; a 3DoF filter configured to provide corrections to the IMU integrator; a deep inertial odometry (DeepIO) network coupled to the IMU integrator, the DeepIO network configured to receive the pose and provide feedback to the IMU integrator; and a Kalman filter configured to filter an output of the DeepIO network.

In some aspects, the techniques described herein relate to a method, including: initializing a first processor; during the initializing, using a second processor to provide a first portion of a data stream during a first time interval; after the initializing, using the first processor to provide a second portion of the data stream during a second time interval. upon detecting a failure mode of the first processor, causing the first processor to begin a re-initialization process; using the second processor to provide a third portion of the data stream during the re-initialization process within a third time interval; and upon completion of the re-initialization process, using the first processor to provide a fourth portion of the data stream during a fourth time interval.

BRIEF DESCRIPTION OF THE DRAWINGS

Components in the drawings are not necessarily to scale relative to each other. Like reference numerals designate corresponding parts throughout the several views.

DETAILED DESCRIPTION

Current approaches to 6DoF tracking for AR rely heavily on images of features within a scene to provide accurate estimates of the pose of the AR device at regular time intervals. Features include, for example, people or objects present within the scene, landscape elements, and the like. The features can be extracted from these images by a tracking system, for use during a pose estimation process. The pose can, for example, represent a position (e.g., X, Y, Z position) and an orientation (e.g., yaw, pitch, and roll) of a headset within an environment such as a three-dimensional (3D) space.

Certain drawbacks exist in the process of feature extraction. For example, feature extraction consumes a lot of power, lacks privacy, and can be unreliable, e.g., when there are no features in the scene, or when fast motions occur. Moreover, the pose estimation process can fail when motions associated with these features are inconsistent such as, for example, when there are multiple people in front of the camera, or when the user is in an elevator. When the pose estimation process fails, e.g., due to lack of features, fast motions, inconsistent motions, or occlusions, the tracking system triggers a reset followed by a re-initialization, which interrupts visualization and can ruin the user's immersive experience. In some systems, a reset can occur, on average, once every 90 seconds, interrupting the experience for about three seconds, during which the AR content disappears. This disruption is even more dramatic at the beginning of a session, especially during Google LiveView™ or Google Mobile Maps™ experiences, wherein about one third of the time, the user may have to wait at least five seconds for AR content to resume appearing on the AR display.

In some implementations, to cope with these issues, inertial measurement units (IMUs) can be used in conjunction with images to provide information about the pose. Ideally, the IMU would be able to supply pose information while the 6DoF tracking algorithm is initializing or re-initializing, thereby providing a continuous user experience. However, the process of IMU integration may not be very accurate and can drift significantly over time. In some systems, after only one second, the error in IMU integration becomes so large that the estimated pose is not usable.

Some technical solutions, as described herein, can provide the user with a continuous reset-free AR experience. In some implementations, a neural network can be used to correct for IMU integration drifts. In some implementations, when the original 6DoF tracking algorithm based on image extraction e.g., "Visual-Inertial Simultaneous Localization and Mapping (SLAM)" fails or is close to a failure, a parallel system, e.g., "IMU-based 6DoF," can be configured to support the 6DoF pose in place of the original algorithm. In some implementations, the IMU-based 6DoF uses a neural network that exploits the device's past motion to infer its future motion.

Figure 1A:
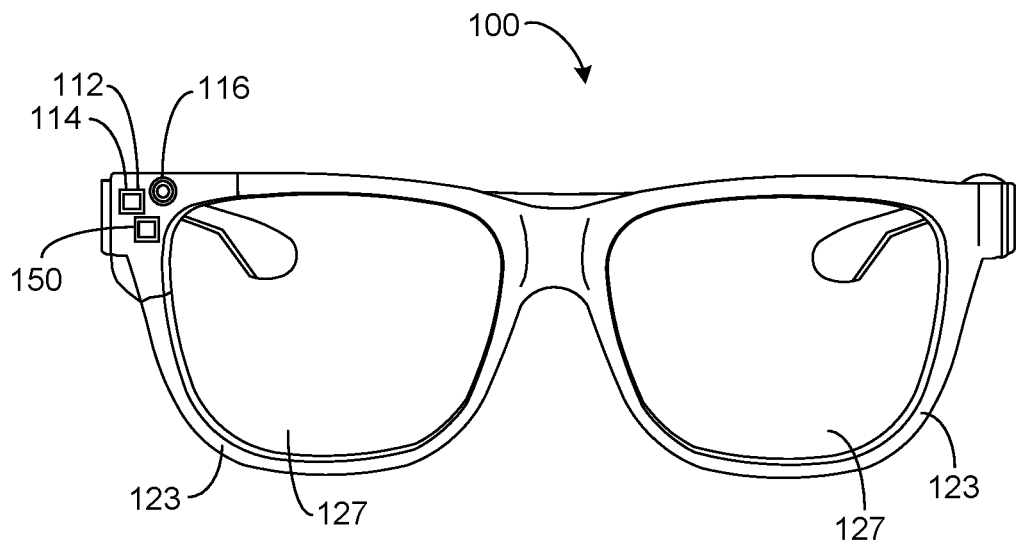
FIG. 1A is a pictorial front view of a head-mounted display suitable for use in an augmented reality (AR) system, according to a possible implementation of the present disclosure.
Figure 1B:
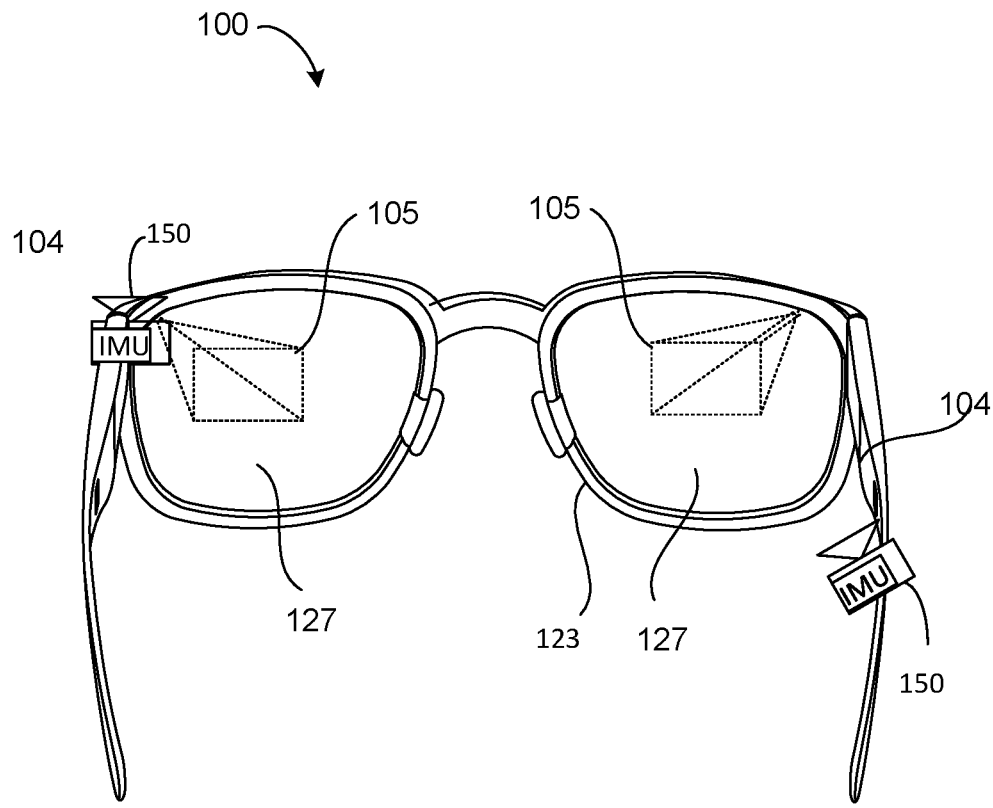
FIG. 1B is a pictorial rear view of a head-mounted display suitable for use in an augmented reality (AR) system, according to a possible implementation of the present disclosure.

FIGS. 1A and 1B show pictorial views of AR glasses 100, according to a possible implementation of the present disclosure. The AR glasses 100 are an example of a head-mounted display, or headset, suitable for use in creating an immersive experience for a user. The AR glasses 100 include, among other components, a projector 104, a display area 105, a control system 112 that includes an image processor 114, a camera 116, a frame 123, lenses 127, arms 130, and one or more IMUs 150.

FIG. 1A shows a front pictorial view of the AR glasses 100, illustrating placement of the camera 116 and the control system 112. Image data captured by the camera 116 can be processed by the image processor 114 within the control system 112. In some examples, the control system 112 may include a communication module, e.g., an RF headset transceiver, providing for communication and exchange of information between the AR glasses 100 and other external devices. In some implementations, the transceiver includes a receiver and a transmitter configured to operate in different bands, or frequency ranges, depending on the type or location of the external devices. For example, the AR glasses may communicate with external sensors using short-range signals, e.g., Bluetooth™, and with a network server, e.g., an Internet server, using longer-range RF signals such as Wi-Fi or 4G/5G.

FIG. 1B shows a rear pictorial view of the AR glasses 100, illustrating placement of the IMU 150, the projector 104, and the display area 105. Images captured by the camera 116 are projected by the projector 104 onto the display area 105, located on an inside surface of one of the lenses 127, e.g., the right lens, of the AR glasses 100. One or more IMUs 150 can be located at a fixed corner, or on a moveable arm 130 of the AR glasses 100. Each IMU 150 includes micro-electromechanical (MEMs) devices such as accelerometers and gyroscopes that can measure orientation and motion of the AR glasses 100 to which they are attached, and by inference, motion of the user's head relative to the environment. In some implementations, IMU data can be processed along with image data in the image processor 114. Further, the image processor 114 located on the head-mounted display (HMD), e.g., headset, or AR glasses, can also implement the tracking algorithm(s) described herein.

Figure 2:
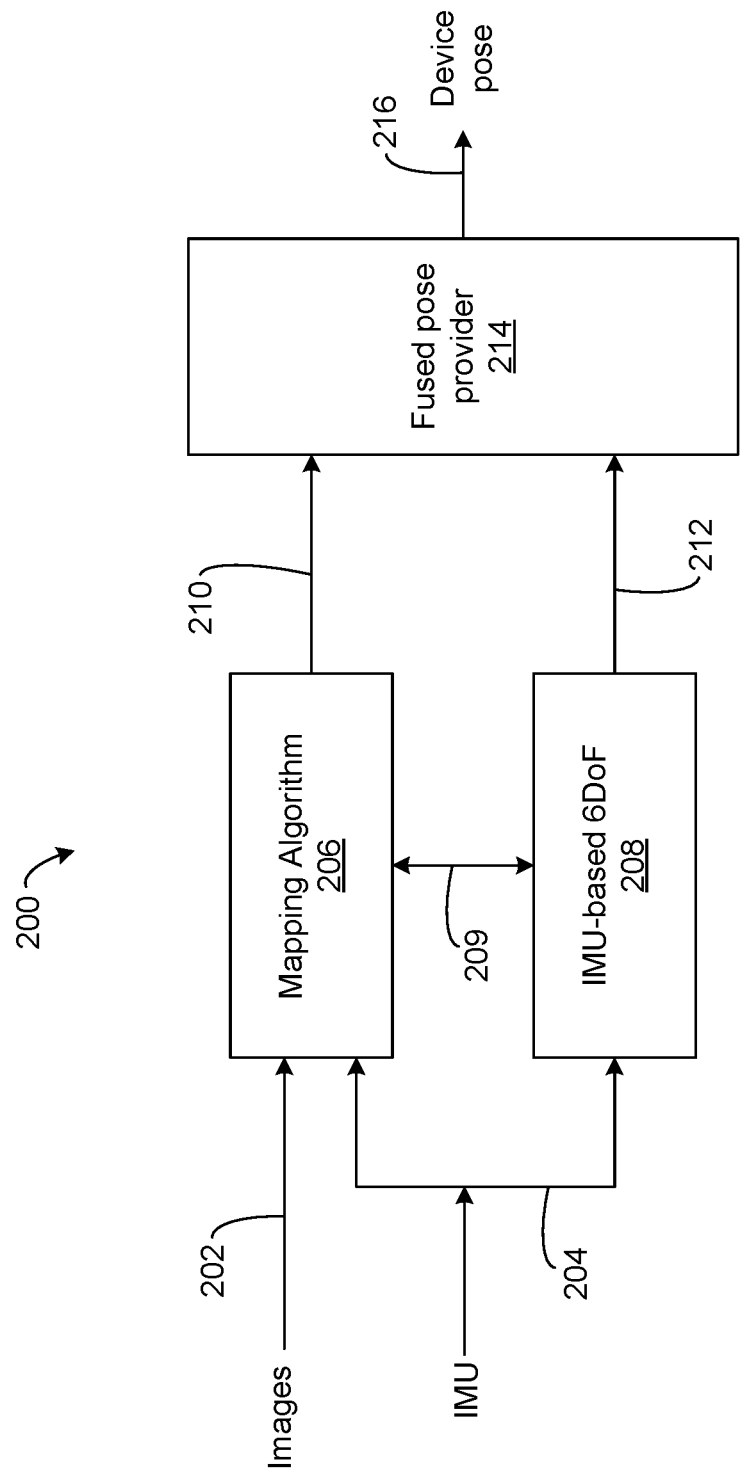
FIG. 2 is a high level block diagram of a tracking system that incorporates an IMU-based 6DoF processor according to a possible implementation of the present disclosure.

FIG. 2 is a high-level block diagram illustrating a tracking system 200, according to a possible implementation of the present disclosure. The tracking system 200 combines image data 202 from the camera 116 with IMU data 204 from the IMU 150 to produce a final device pose 216. The device pose 216 represents the position and orientation of the AR headset. The image data 202 and the IMU data 204 are input to an image processor configured with a mapping algorithm (e.g., a Visual-Inertial simultaneous localization and mapping algorithm (SLAM)) 206. The IMU data 204 is also input to an IMU processor configured with an IMU-based six-degrees-of-freedom algorithm, IMU-based 6DoF 208, which is coupled to the mapping algorithm 206 by a communication path 209. A fused pose provider 214 integrates a mapping pose stream component 210 with an IMU-based 6DoF pose stream component 212 to produce a composite device pose, e.g., the final device pose 216.

Figure 3A:
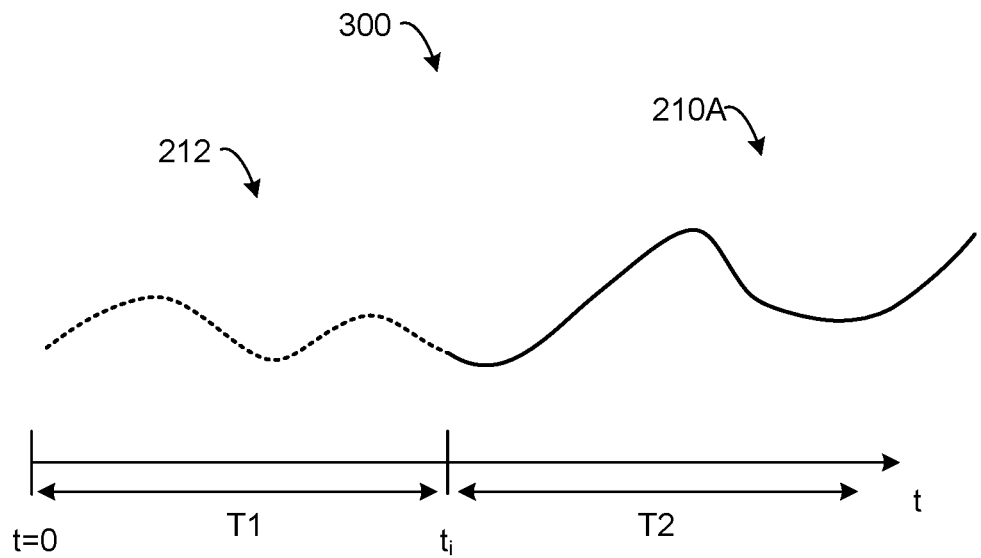
FIGS. 3A and 3B are plots of a pose output signal as a function of time, according to a possible implementation of the present disclosure.
Figure 3B:
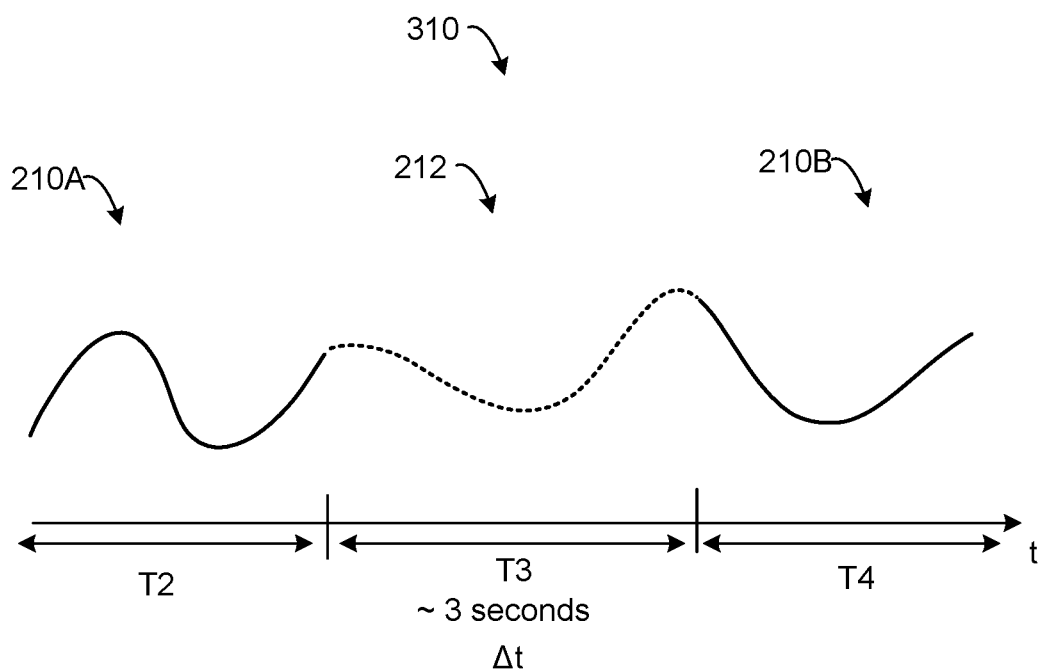

FIGS. 3A and 3B illustrate how the IMU-based 6DoF 208 and the mapping algorithm 206 cooperate to create a continuous AR experience. FIG. 3A shows a plot of a pose output signal 300 as a function of time, according to a possible implementation of the present disclosure. From time t=0 until the mapping algorithm 206 is initialized at time $t_i$, the mapping algorithm 206 cannot provide the device pose 216. Instead, the IMU-based 6DoF fallback pose stream component 212 can provide a continuous AR experience by supporting 6DoF poses while the original mapping pose stream component 210 is initializing. During the initialization period, the mapping algorithm 206 builds an initial map to be able to provide poses. The initial map is based on a few images, or video frames, of high quality, so the initialization time $t_i$ can take several seconds to accumulate several images from the camera 116. In contrast, the IMU-based 6DoF 208 does not need an initial map, so tracking can be performed almost immediately, in about 0.1 second.

FIG. 3B shows a plot of a pose output signal 310 as a function of time, according to a possible implementation of the present disclosure. During a later time interval Δt, the mapping algorithm 206 is interrupted by a re-initialization process and cannot provide the device pose 216. In some instances, the re-initialization process may be triggered by a lack of reliable features in the image data 202 and may last about 3 seconds. During the re-initialization process, the IMU-based 6DoF fallback pose stream component 212 can provide a continuous AR experience by supporting 6DoF poses while the original mapping pose stream component 210 is re-initializing.

Figure 4:
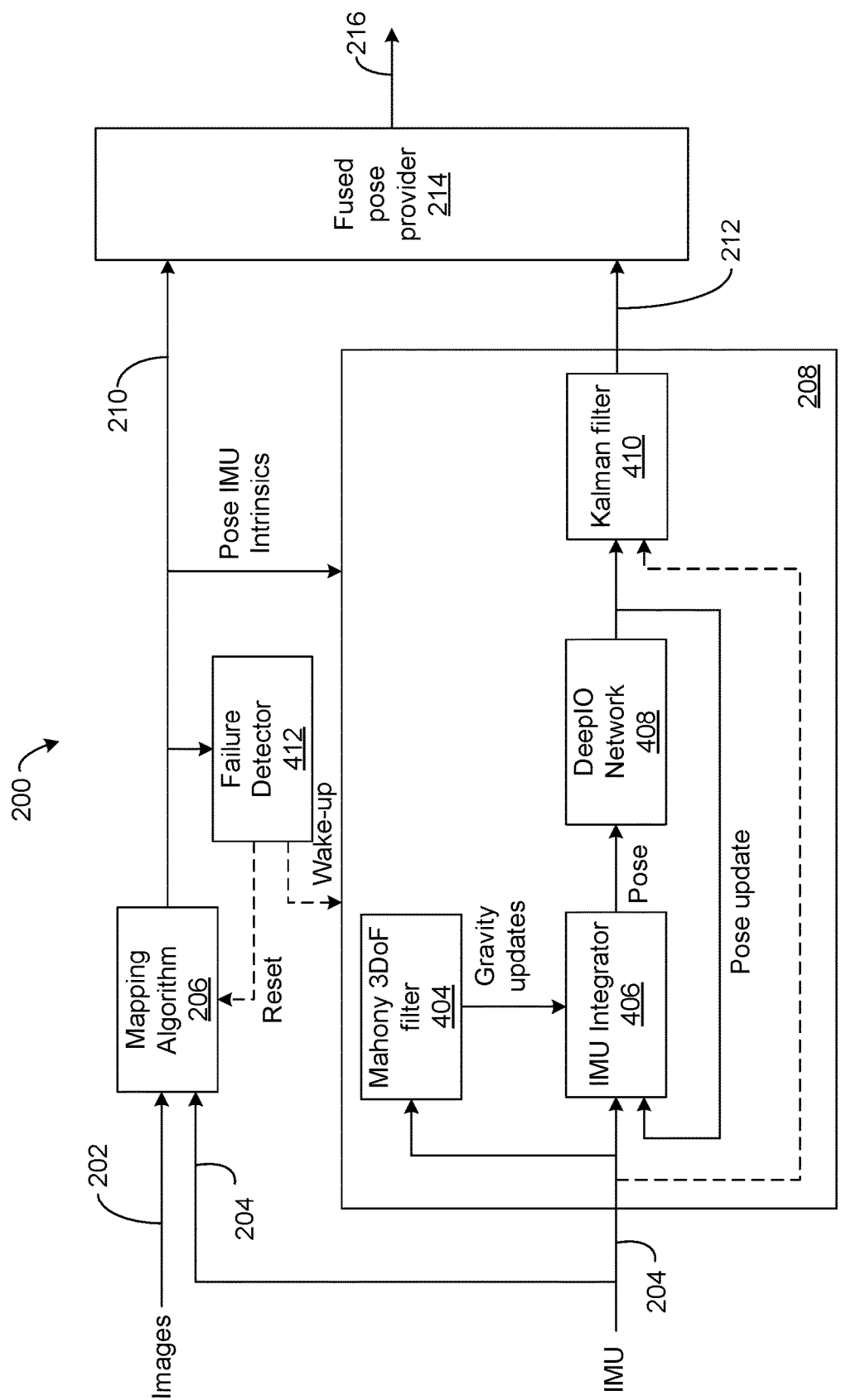
FIG. 4 is a block diagram illustrating components of an IMU-based 6DoF processor according to a possible implementation of the present disclosure.

FIG. 4 is a detailed block diagram illustrating components of the IMU-based 6DoF 208 within the tracking system 200, according to a possible implementation of the present disclosure. In some implementations, the IMU-based 6DoF 208 includes a Mahony 3DoF filter 404, an IMU integrator 406, a Deep Inertial Odometry (DeepIO) network 408, and a Kalman filter 410. In addition, a failure detector 412 can be coupled to the mapping algorithm 206.

As shown in FIG. 4, when the original tracking algorithm, e.g., the mapping algorithm 206, is running, it provides a continuous feed to the IMU-based 6DoF 208 containing the last estimated poses and/or the last estimated IMU intrinsics. In some implementations, the fused pose provider 214 receives poses from the mapping algorithm 206 and can directly output the poses without modification.

In some implementations, the failure detector unit 402 supervises the performance of the Visual-Inertial SLAM 206 and determines whether the output of the mapping algorithm 206 is good, or if it has failed, or if it is close to a failure. In at least the last two cases, the failure detector unit 402 sends a reset signal to the mapping algorithm 206, which resets itself and begins a re-initialization process.

In some implementations, while the mapping algorithm 206 re-initializes, the IMU-based 6DoF 208 supplies poses to the fused pose provider 214. In some implementations, internally, the IMU-based 6DoF 208 runs an IMU integrator 406, the output of which is fed to a neural network, e.g., the DeepIO network 408. In some implementations, the DeepIO network 408, in turn, corrects integration errors using past device motions estimated by the mapping algorithm 206, prior to the reset and feeds a pose update back to the IMU integrator 406 for a next iteration.

In some implementations, to compensate for, e.g., cope with, orientation drifts, a filter, e.g., the Mahony 3DoF filter 404, can be used to periodically provide adjustment to a gravity direction of the IMU integrator 406. In some implementations, in a final stage, a filter, e.g., the Kalman filter 410, can be used to reduce pose jitter by fusing the original IMU data 204 with the output of the DeepIO network 408.

In some implementations, the fused pose provider 214 acts as a switch between the two sources of pose estimates, i.e., the IMU-based 6DoF 208 and the mapping algorithm 206. In some implementations, these sources generate poses asynchronously since the mapping algorithm 206 takes a longer time to estimate a pose than the IMU-based 6DoF 208. In some implementations, each source uses a different coordinate system. In some implementations, the fused pose provider 214 can be configured to manage time synchronization of the sources and transform each incoming pose component into a common coordinate frame. In some implementations, a matrix used to perform a coordinate transformation can be computed whenever, e.g., computed every time, there is an overlap in time between poses generated by the mapping algorithm 206 and poses generated by the IMU-based 6DoF 208. In some implementations, an overlap can occur just before the mapping algorithm 206 resets, and also just after the mapping algorithm 206 finishes the re-initialization process. In some implementations, the matrix is computed by retaining a gravity direction from the mapping algorithm 206 and obtaining a yaw direction from the IMU-based 6DoF 208.

Figure 5:
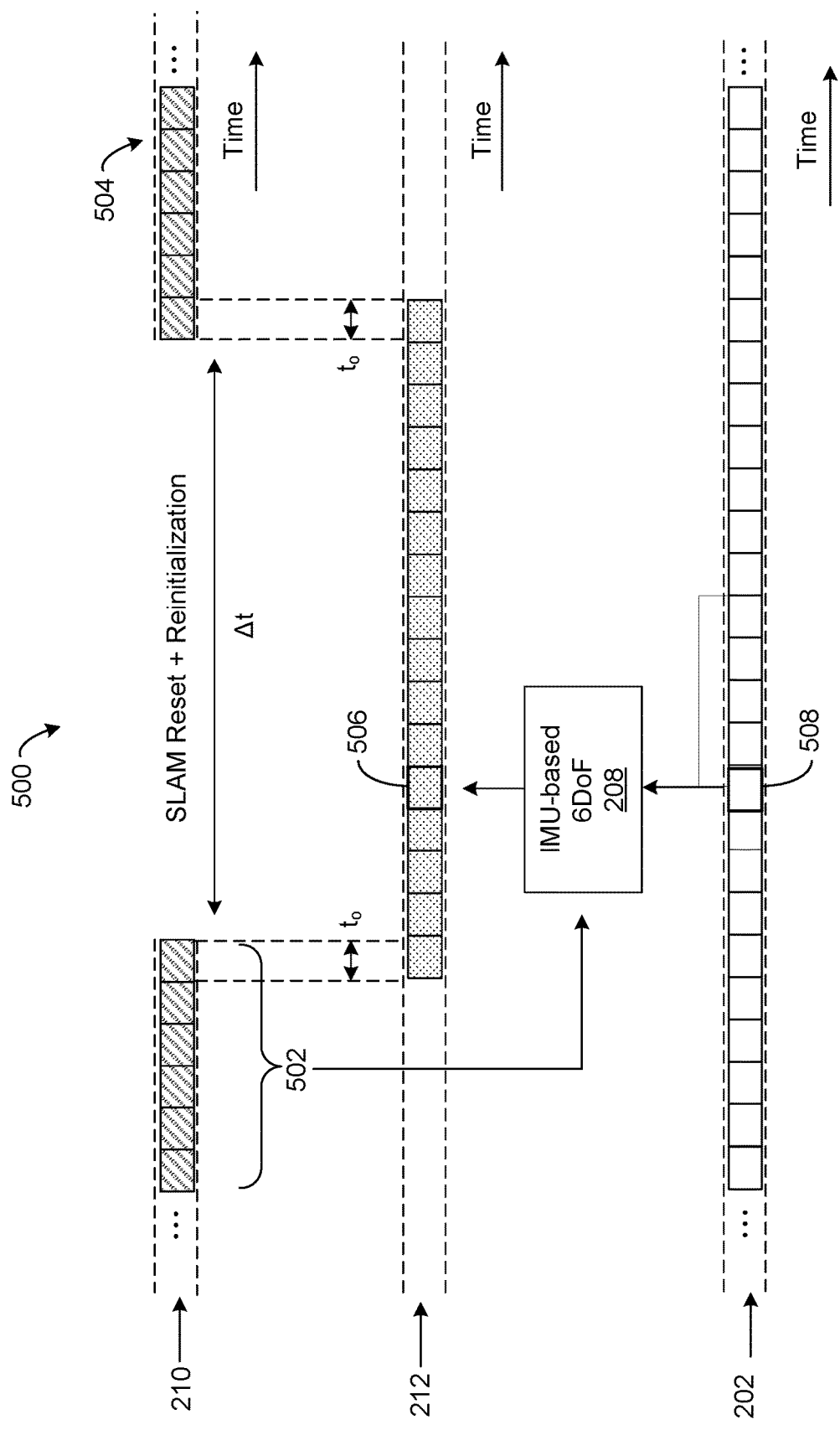
FIG. 5 is a timing diagram illustrating cooperation of a Visual-Inertial SLAM processor with an IMU-based 6DoF processor, according to a possible implementation of the present disclosure.

FIG. 5 is a timing diagram that illustrates a timing sequence 500, according to a possible implementation of the present disclosure. FIG. 5 illustrates how the two main components of the tracking system 200 can work together to provide a seamless AR experience. In the timing sequence 500, the first pose stream component 210 and the second pose stream component 212 participate to create a continuous data stream for input to the fused pose provider 214, to produce the device pose 216. During normal operation, the mapping algorithm 206 estimates image-based poses, e.g., poses 502 at regular time intervals, as elements of the first pose stream component 210. In some implementations, when the failure detector 412 detects a failure mode and triggers a reset of the mapping algorithm 206, the mapping algorithm 206 pauses. The IMU-based 6DoF 208 then intervenes to provide the fused pose provider 214 with an alternative data stream, e.g., the second pose stream component 212.

In some implementations, while the mapping algorithm 206 proceeds with re-initialization, in parallel, for a duration $\Delta t$, the IMU-based 6DoF 208 generates a measurement-based pose, e.g., a pose 506 by taking the last n seconds of poses 502 estimated by the mapping algorithm 206 and using these previous poses as prior information for future pose estimates. In some implementations, when an inertial measurement 508 is provided by the IMU, the IMU-based 6DoF 208 uses the poses 502 together with the inertial measurement 508 to generate a pose 506, as an element of the second pose stream component 212.

In some implementations, once the re-initialization process of the mapping algorithm 206 has terminated, the IMU-based 6DoF 208 stops producing poses 506, and the mapping algorithm 206 resumes producing poses 504 as elements of the first pose stream component 210. In some implementations, an overlap to between poses 506 produced by the IMU-based 6DoF 208 and poses 502 or 504 produced by the mapping algorithm 206 is used to compute a transformation. The transformation transfers a coordinate frame of the first pose stream component 210 and a coordinate frame of the second pose stream component 212 into a common coordinate frame.

Figure 6:
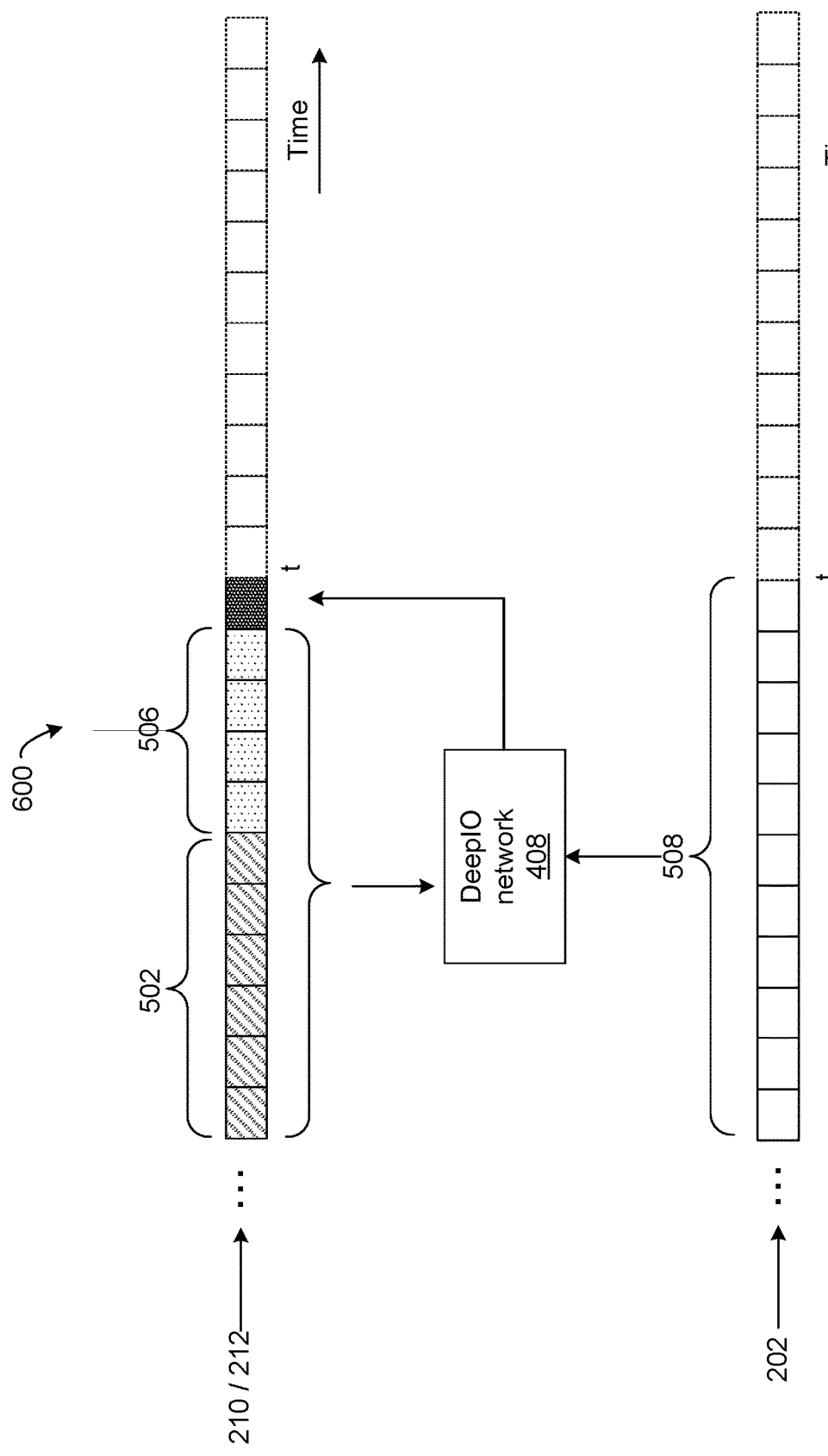
FIG. 6 is a timing diagram illustrating incorporation of a neural network in a tracking system, according to a possible implementation of the present disclosure.

FIG. 6 is a timing diagram that illustrates a timing sequence 600, according to a possible implementation of the present disclosure. FIG. 6 illustrates the role that the DeepIO network 408 provides in creating a seamless AR experience. In the timing sequence 600, the DeepIO network 408, which is within the IMU-based 6DoF 208, operates as a neural network on a sliding window of an input signal. The input signal to the DeepIO network 408 can include at least some portions of the pose stream component 210, e.g., the poses 502, as well as some portion of the of the pose stream component 212, e.g., the poses 506. In some implementations, the input signal to the DeepIO network 408 further includes some portion of the IMU stream of measurement data 204, e.g., the inertial measurements 508.

FIG. 6 illustrates how the DeepIO network 408 estimates the next pose at a time t. In some implementations, the DeepIO network 408 uses the previous k estimated poses 502 and 506, from time t-k*D to time t-D in a combined pose stream 210/212, and the previous IMU measurements from time t-k*D to time t, wherein D is the duration of each individual pose. In some implementations, the previous k poses could have been generated either by the mapping algorithm 206 before the reset was triggered, or by the IMU-based 6DoF 208, or by the DeepIO network 408 itself. In some implementations, using these two sets of information, the DeepIO network 408 estimates the pose at time t, and then repeats the process.

FIGS. 7-12 present additional details related to development of a machine learning algorithm able to estimate, from IMU measurements, the 6DoF pose of a mobile device, e.g., an AR headset such as AR glasses 100. Some implementations can include using a high dimensional latent space to model the current motion state instead of a simple 6-dimensional state (composed of position and velocity). In some implementations, this can allow for a more complex representation of the trajectory space.

Figure 7:
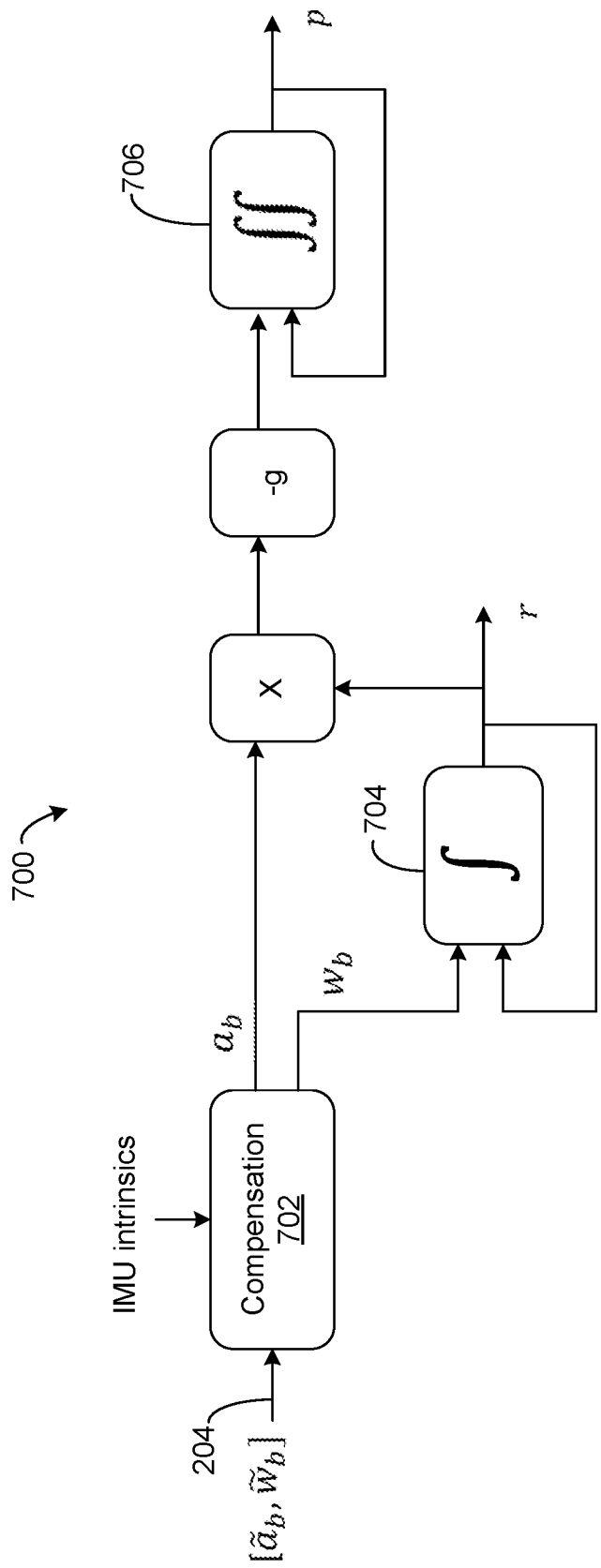
FIG. 7 is a schematic diagram of an IMU integrator, according to a possible implementation of the present disclosure.

FIG. 7 is a schematic diagram of the IMU integrator 406, according to a possible implementation of the present disclosure. The IMU integrator 406 includes a compensation block 702, an integrator 704, and a double integrator 706. The IMU integrator 406 receives as input IMU data 204 from the IMU 150, e.g., an acceleration vector $ã_b$ measured by an accelerometer and an angular momentum vector $\omega_b$ measured by a gyroscope. The IMU integrator 406 can then solve the following system of differential equations for angular position r(t), velocity (v(t), and position p(t):

$$\dot{r}(t) = r(t) \cdot (w_b(t)) \times$$

$$\dot{v}(t) = r(t) \cdot a_b(t) - g$$

$$\dot{p}(t) = v(t) \quad (1)$$

wherein p(t) and v(t) denote the object position and velocity at time t expressed in inertial frame coordinates; r(t) denotes the object orientation at time t defined as a rotation matrix transforming body frame coordinates into inertial frame coordinates; and $\omega_b(t)$ and $a_b(t)$ denote the object rotational velocity and translational acceleration at time t, both expressed in body frame coordinates.

The IMU measurements can be corrupted by errors such as bias, scale, axis misalignment, gyro-accelerometer misalignment, and noise. For this reason, IMU measurements can be compensated for such errors by the compensation block 702, using an error model for the particular IMU device, referred to as IMU intrinsics.

Following error compensation, the angular momentum data $\omega_b(t)$ can be integrated once by the integrator 704 to compute a radial position r(t); and the acceleration data $a_b(t)$ can be integrated twice by the double integrator 706 to compute the position p(t), according to the following Eq. 2, wherein p(0) and v(0) denote the initial position and the initial velocity at time 0:

$$r(t) = r(0) \cdot \exp(\int_0^t \omega_b(t') \times dt')$$

$$p(t) = p(0) + \int_0^t (v(0) + \int_0^{t'} r(t'') \cdot a_b(t'') - g dt'') dt' \quad (2)$$

wherein r(t) can be solved numerically using a Runge-Kutta method.

In some implementations, this integration process is very sensitive to noise, such that any small error in measurement, or in the estimate of IMU intrinsics, or in the gravity direction estimation r(t) can be amplified by the double integrator 706 at the end of the process (Eq.2), leading to a positional drift that increases quadratically with time. In particular, an error in the estimation of the gravity direction r(t) can lead to a large gravity residual being double integrated in Eq.2. From Eq.1, gravity is subtracted from the inertial frame acceleration r(t) $a_b(t)$. Since gravity is one of the highest accelerations measured by an IMU during normal usage except during an impact, if the gravity direction is not accurately estimated, the drift might be significant even for a short period of time. In addition, there is a possibility that errors in the initial velocity estimation can (0) generate a positional drift that increases linearly with time.

Figure 8A:
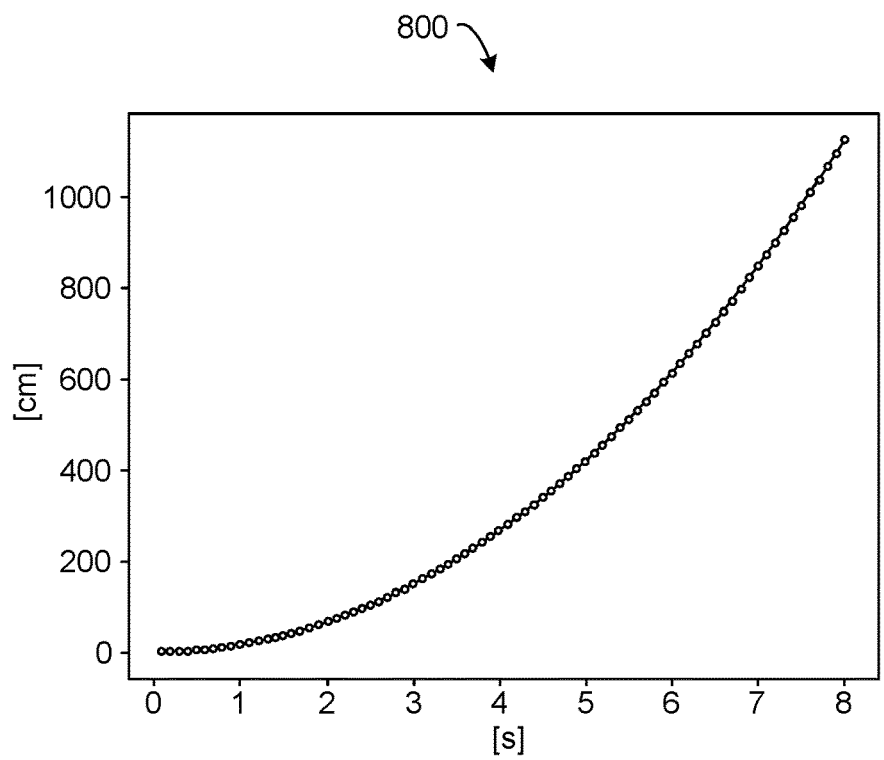
FIGS. 8A and 8B are plots of position error in IMU integration, according to a possible implementation of the present disclosure.
Figure 8:
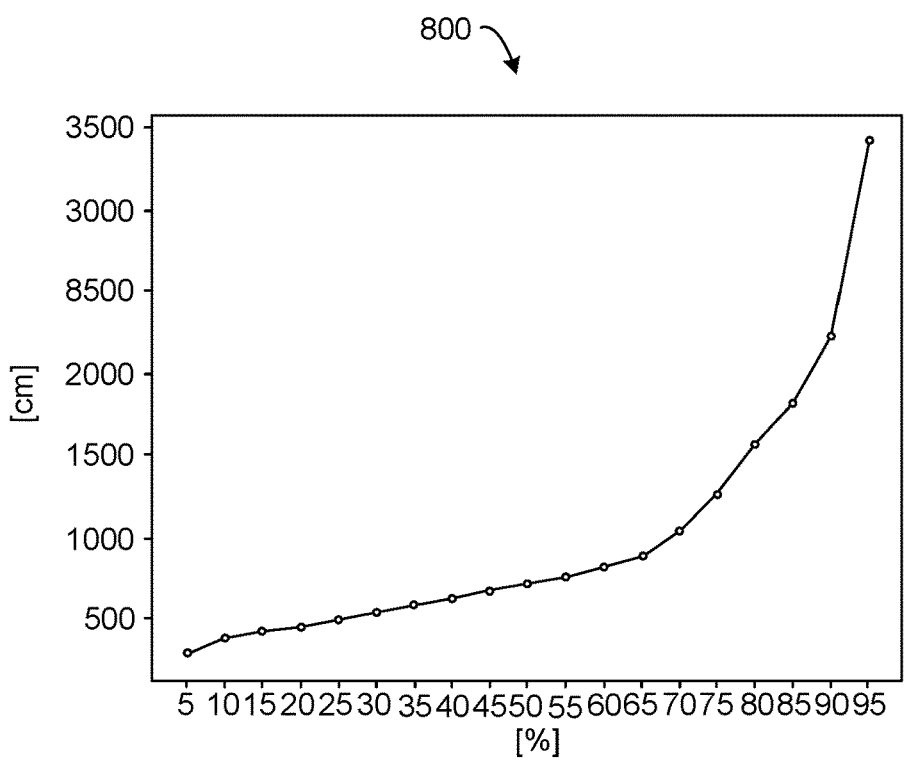

FIGS. 8A and 8B are plots showing rapid growth of IMU integration errors, according to a possible implementation of the present disclosure. FIG. 8A shows a plot 800 of average position error as a function of elapsed time in seconds. FIG. 8B shows a percentile distribution 810 of the position error after 8 seconds.

Experimentally, IMU integration produces an orientation estimate that is generally stable with a drift that increases linearly with time but with a very low linear coefficient. Within eight seconds from a first estimate, the 95th percentile of the orientation error is less than 1 degree. The quadratic behavior of the positional estimate drift, however, is not negligible, as shown in FIGS. 8A and 8B. After only eight seconds the average estimation error can be more than 10 meters, computed over 19,000 walking sequences (FIG. 8A), while the 95th percentile estimate is about 35 meters (FIG. 8B).

Figure 9:
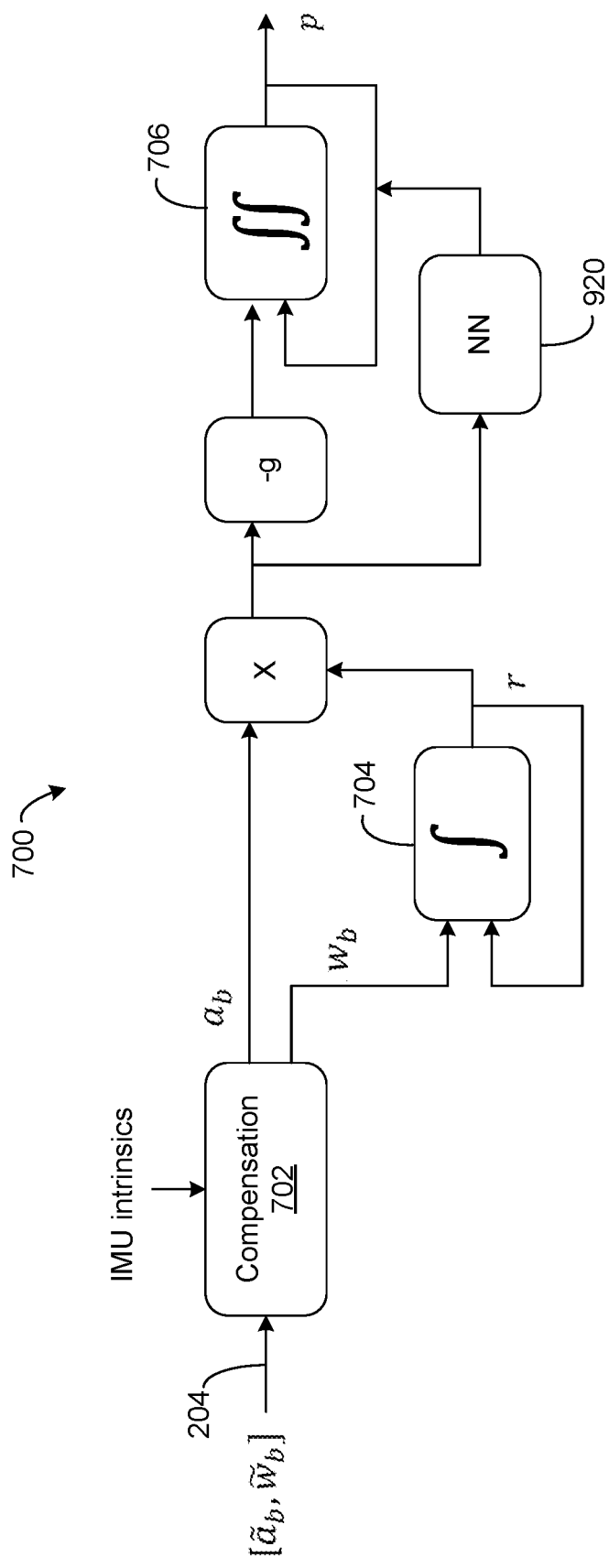
FIG. 9 is a schematic diagram of an IMU integrator that includes a neural network, according to a possible implementation of the present disclosure.

FIG. 9 is a schematic diagram of an enhanced IMU integrator 900, according to a possible implementation of the present disclosure. The enhanced IMU integrator 900 is similar to the IMU integrator 406 shown in FIG. 7, with the addition of a neural network 920. In some implementations, the enhanced IMU integrator 900 includes the compensation block 702, the integrator 704, the double integrator 706, and a neural network 920.

Some implementations of the neural network 920 involve training the neural network 920 end-to-end to simulate a recurrent Bayesian filter.

Some implementations can include forcing the neural network 920 to learn how to correct from its past mistakes, using a batch filtering approach for learning instead of simple supervised learning. In some implementations, this can avoid additional drift to be generated when these mistakes accumulate over time.

Some implementations can incorporate prior knowledge into the network structure instead of learning it from scratch. In some implementations, this can allow for a faster learning process, and a neural network 920 that is at least 20 times smaller in terms of a number of multiply-accumulate operations (MACs).

Some implementations can recompute the filter internal state from the previous estimates instead of encoding it into a recurrent state. In some implementations, this can allow for a smaller and easier-to-train network.

Some implementations can use a filter with 21 memory states instead of a single memory state. In some implementations, this allows for a more robust estimator.

In some implementations, each mistake that the neural network 920 makes, that is not corrected by the network itself, accumulates over time, generating another potential drift. Some implementations described herein cope with this limitation by training the neural network 920 to correct its own mistakes.

The implementations described herein may not use a separate manually-tuned EKF to smooth the estimate, but instead learn the system as a whole, end-to-end, at training time. In some implementations, precisely, the network implementations described herein implement a generic recurrent Bayesian filter that takes as input the previous estimates and the previous observations and produces a final estimate. Internally, the neural network 920 needs to learn the motion model, the observation model, and a state update scheme, end-to-end.

Such configurations can lead to an approach that is not bounded by the actual output space (position and velocity). In some implementations, the shape of the output space and the transformation from and to the actual output space is also learned at training time.

The implementations described herein may not encode the filter internal state into a recurrent state but instead may recompute it at each inference from the previous estimates (the network outputs). In some implementations, in this way the implementations described herein avoid the limitation of the recurrent state size and control the memory capacity using the temporal window size.

Network estimates described herein are highly correlated with previous estimates because the network has visibility over its previous outputs. In some implementations, if trained properly, this allows the neural network 920 to correct its past mistakes, avoiding the drift that might arise when these mistakes accumulate over time. In some implementations, to make sure that this is the case, some implementations introduce the concept of batch filtering for training the network. In some implementations, the idea behind batch filtering is very similar to the unrolling of a recurrent neural network (RNN), but instead of forwarding the internal state of a network, some implementations concatenate the previous network estimates and feed them back to the network.

The filter described herein has a memory of 21 past estimates, while in some other implementations the memory is limited by the pre-tuned EKF and set to 1 single state. In some implementations, having more memory state leads to a more robust estimator.

Some implementations described herein incorporate prior knowledge inside the network structure. Some implementations do not force the neural network 920 to learn what is already known about the problem. For instance, some implementations transform vectors and quaternions between IMU-frame and world-frame coordinates, and also perform numerical integration (see Eq. 2). In some implementations, incorporating these basic tools into the network structure allows for a faster learning process and a smaller network. Some other implementations do not train the entire system end-to-end, leading to a suboptimal solution.

Some implementations allow building a network that is at least 20× smaller, making it more suitable for real-time applications.

Some implementations described herein use a neural network 920 to learn a Bayesian filter running in parallel with the IMU integrator 406, which corrects the IMU integrator estimate every 100 ms, as in FIG. 9.

Figure 10:
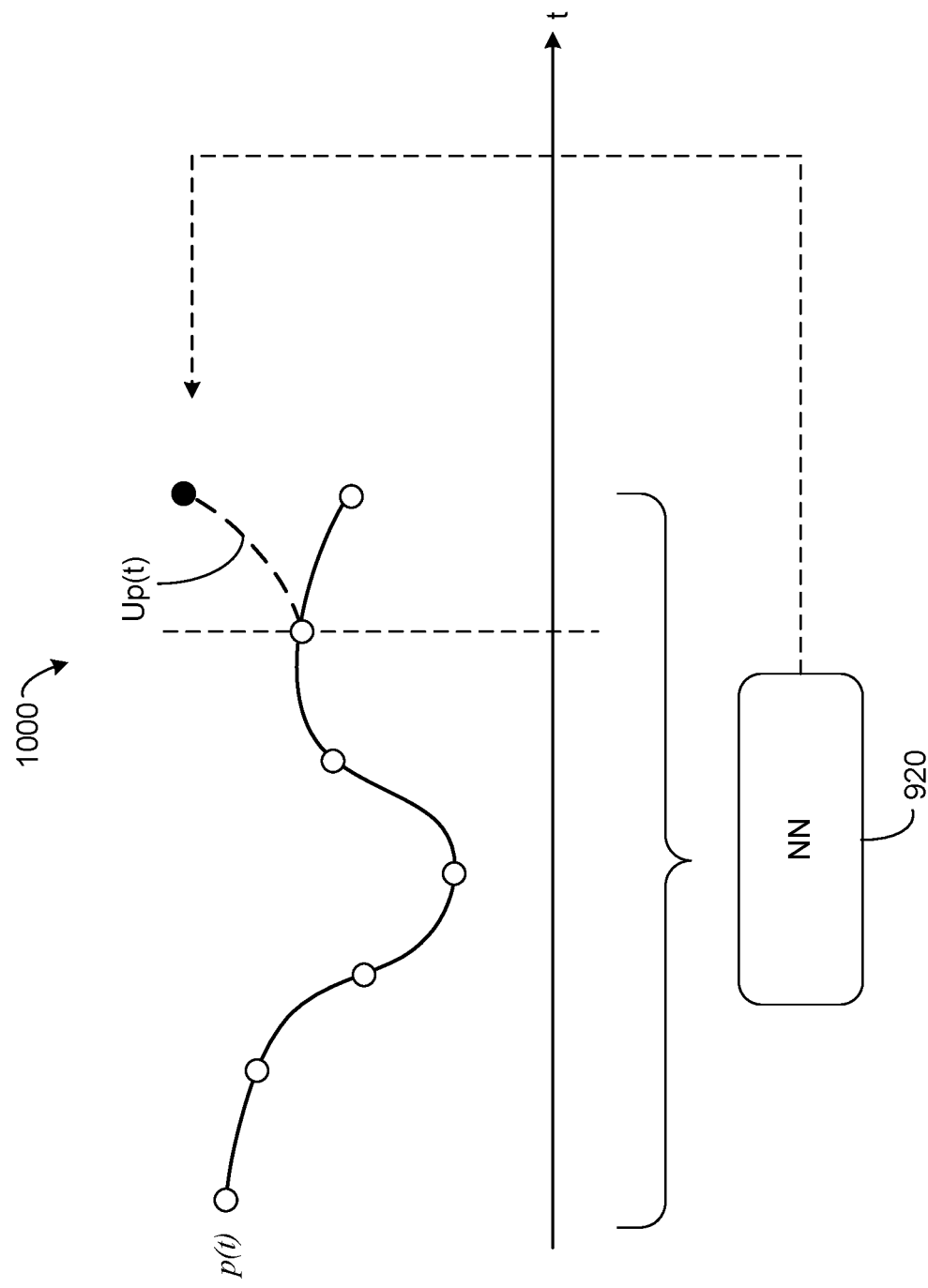
FIG. 10 is a data flow diagram of an IMU integrator, according to a possible implementation of the present disclosure.

FIG. 10 is a plot of a position data set p(t), according to a possible implementation of the present disclosure. FIG. 10 illustrates modification of the position data set p(t) by the neural network 920. In some implementations, the neural network 920 takes as input the last two data points, that is, the last two seconds of state estimates p(t) and v(t) from either the IMU integrator 406 or the neural network 920, together with the last 2 seconds of inertial frame acceleration measurements r(t) $a_b(t)$, and estimates a correction, up(t) and uv(t), for the current state estimate provided by the IMU integrator 406.

In some implementations, the neural network 920 uses prior motion to correct for errors introduced by the IMU integrator 406, exploiting a correlation between these motions and IMU measurements 204 that it has learned during training. In some implementations, while the IMU integrator 406 runs at 100 Hz, the neural network 920 inference is run at 10 Hz.

In some implementations orientation estimates provided by the IMU integrator 406 are assumed to be sufficient for a long period of time and are not required to be corrected by the neural network 920.

In some implementations, an initial orientation is provided by the Mahony 3DoF filter 404, while subsequent updates are provided by the IMU integrator 406. In some implementations, the Mahony 3DoF filter 404 provides a gravity direction estimate that is more accurate than the gravity direction estimate provided by the IMU integrator 406, which can drift over time. In some implementations, the Mahony 3DoF filter 404 is asked to produce a new orientation estimate every five seconds. In some implementations, the orientation estimate is used to correct the gravity direction of the IMU integrator 406. In some implementations, this approach produces an almost drift free, gravity aligned, 3DoF orientation estimator which is sufficient as input to the neural network 920. As mentioned above, the neural network 920 can be inserted just before the double integration block 906, thereby avoiding feeding the neural network 920 with raw gyroscope and accelerometer measurements. In some implementations, this choice has many advantages and permits considerable simplification of the training process without losing generality.

In some implementations, the neural network 920 does not learn what is already known about the dead reckoning problem. Instead, some implementations inject this as prior knowledge into the neural network 920, as part of its graph, so that the learning process is simpler, and the number of trainable weights required is lower. As an example, if some implementations would input to the network quaternions, the network would need to learn a transformation from a quaternion to a rotation matrix and how to apply this rotation to a vector. In some implementations, this can be a waste of neurons that require training in parallel with the dead reckoning problem itself.

For at least this reason, Eq.2 for the velocity and position as a function of time are incorporated into the structure of the neural network 920. Eq.2 can be first discretized as follows:

$$v(t)=v(t-dt)+\Delta_v(t)$$

$$p(t)=p(t-dt)+v(t-dt)dt+\Delta_p(t) \quad (3)$$

wherein a time interval dt can be equal to 100 ms or the network inference period. P(t) and v(t) are the IMU integrator estimates of p(t) and v(t) computed between time t-dt and time t, assuming initial position and initial velocity are both zero.

$$\Delta v(t)=\int_{t-dt}^{t} T(t') \cdot a_b(t')-g dt'$$

$$\Delta p(t)=\int_{t-dt}^{t} \Delta v(t') dt' \quad (4)$$

It is noted that, p(t) and v(t) depend only on the last 100 ms of IMU measurements, and not on past estimates if r(t) is excluded, as provided by the 3DoF module. In some implementations, therefore, p(t) and v(t) provide us with the position and velocity estimate that a classic IMU integrator would output at time t, but without the influence of previous estimation errors. In some implementations p(t) and v(t) are therefore suitable variables to channel prior knowledge about dead reckoning into the neural network 920.

While Eq.4 represents the classic IMU integrator formula for position and velocity, Eq. 5 represents the IMU integrator version augmented with the neural network 920:

$$v(t)=v(t-dt)+\Delta_v(t)=u_p(t)$$

$$p(t)=p(t-dt)+v(t-dt)dt+\Delta_p(t)+u_v(t) \quad (5)$$

wherein up(t) and uv(t) are corrections, or updates, estimated by the neural network 920 at time t.

In some implementations, the IMU measurements may not be produced at a uniform sampling rate. In some implementations, although it is possible to train a network to deal with such non-uniform input, it may not be the best way to tackle the problem. The implementations described herein therefore ensure that the inputs p(t), v(t), p(t), and v(t) are sampled at, for example, 100 ms intervals.

At least one benefit of this formulation is that each quantity can be expressed in inertial frame coordinates, so that the neural network 920 does not have to learn how to convert between body frame and inertial frame.

In some implementations, a fully convolutional 1D neural network is used with a dense layer as read-out. In some implementations, the neural network 920 takes as input a sliding window of 21 samples representing the states, p(·) and v(·), and the deltas, Δp(t) and Δv(t), computed over the last 2 seconds. In some implementations, each sample i represents the state and the deltas recorded at time t−i·dt wherein t is the current inference time. For sample i=0, only the deltas are available since the state has not yet been estimated. In some implementations, to simplify the work of the neural network 920 the state is set to the estimate provided by the standard IMU integrator.

$$\text{sample}(i)=[p(t-i\cdot dt),v(t-i\cdot dt),\Delta_p(t-i\cdot dt),\Delta_v(t-i\cdot dt)]$$

$$\text{sample}(0)=[p(t-dt)+v(t-dt)\cdot dt+\Delta_p(t),v(t-dt)+\Delta_v(t),\Delta_p(t),\Delta_v(t)]$$

Each input sample is therefore a vector of 12 elements. The network outputs a vector of six elements representing the state correction at time t, up(t) and uv(t). The final estimate for the state at time t is computed using Eq.5.

Figure 11:
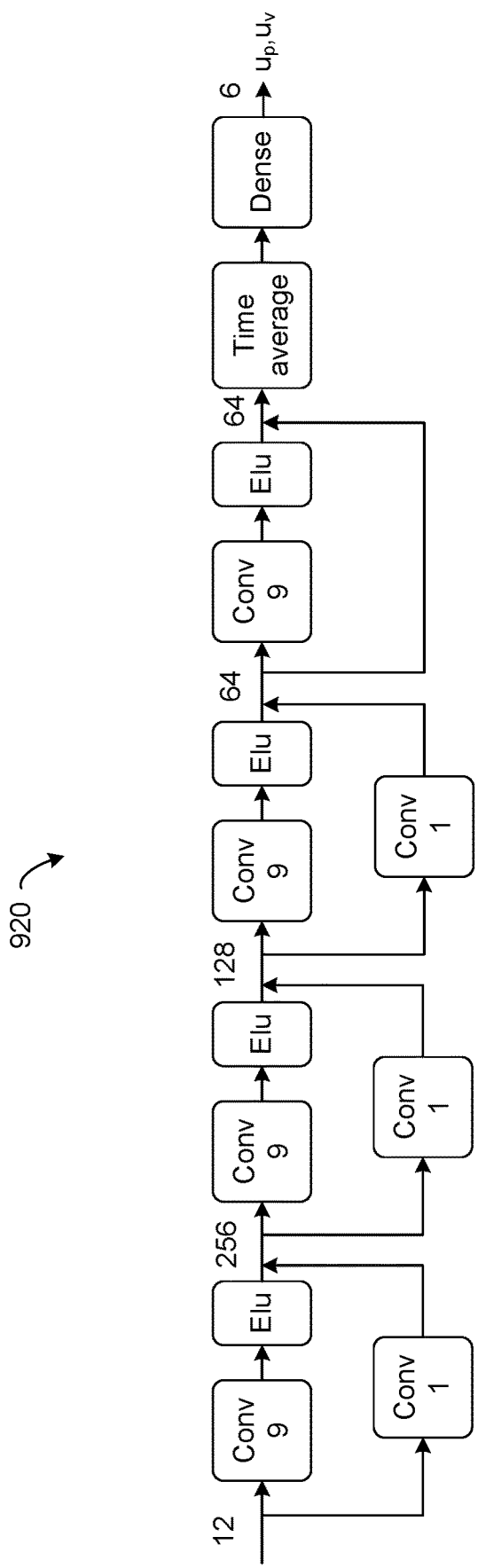
FIG. 11 is a block diagram of a neural network, according to a possible implementation of the present disclosure.

FIG. 11 illustrates the structure of a neural network 920, e.g., the DeepIO network 408, according to a possible implementation of the present disclosure. In FIG. 11, "Cony 9" indicates a convolutional layer with kernel size 9, while "Cony 1" indicates a pointwise convolutional layer. Because the network 920 is addressing a regression problem and not a classification problem, "elu" is chosen over "relu" for its smooth nonlinear behavior around zero. In some implementations, each convolutional layer has stride 1 and variable dilation to allow for a pyramidal analysis of the input signal, with increasing receptive field. In some implementations, the first layers may be more sensitive to high frequencies in the input signal, while the last layers may be more sensitive to low frequencies.

In some implementations, properties of the neural network 920 can be as follows: floating point operations per second (FLOPS)=23,600,000; storage size in memory=2 Mb; inference frequency=10 Hz; inference time=1.5 ms on a pixel 4A or 1.2 ms on a pixel 4XL.

In some implementations, if the neural network 920 is trained in a supervised manner where a sequence of 21 samples is provided as input and a single sample is expected as output, the final network might still suffer from drift. In some implementations, the reason for this can be because 50% of the data provided as input to the neural network 920 has been generated by the network itself at previous inferences. In some implementations, therefore, training on a ground truth dataset may not allow the neural network 920 to learn from its own mistakes, simply because it has not seen them. Moreover, while a small error in the estimate provided by the neural network 920 after 100 ms of IMU integration is still acceptable for a supervised learning loss function, this error might quickly generate a big drift after 100 inferences, e.g., after 10 seconds.

In some implementations, to cope with this, the neural network 920 can be trained by unrolling it 100 times. In some implementations, this may be considered trivial for an RNN but non-trivial for a sliding window network like the one being used in neural network 920, because the output of each inference is concatenated with the input at the next inference. For this reason, some implementations use a batch filter, designed specifically for learning. A Bayesian filter has a recurrence of type:

$$\text{state}(t)=\text{batch filter}(\text{states}(t-1),\ldots,\text{states}(t-w),\text{measurements}(t),\text{measurements}(t-w+1)).$$

Figure 12:
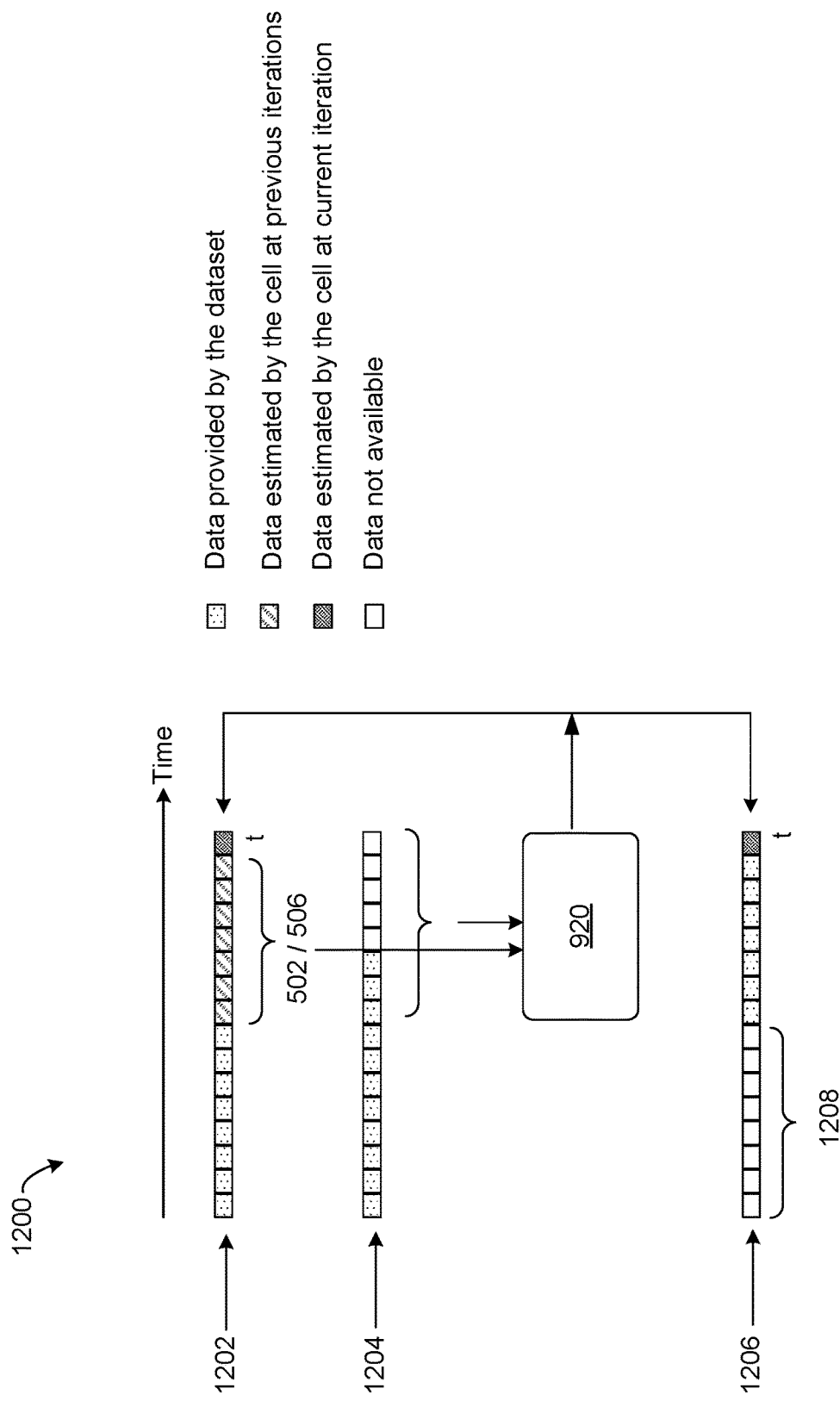
FIG. 12 is a timing diagram for use in training a neural network, according to a possible implementation of the present disclosure.

FIG. 12 is a timing diagram that illustrates inputs and outputs for use in training the neural network 920, according to a possible implementation of the present disclosure. In some implementations, a loopback input 1202 can be used. That is, an input that may be updated at every inference, can be used to represent position and velocity states p(t) and v(t), respectively, evolving over time, while a read-only input 1204 can be used to represent changes in the position and velocity, Δp(t) and Δv(t), respectively. In some implementations, a normal output 1206 can be used to store a network confidence level at each inference.

In some implementations, the neural network 920 can generate corrections, up(t) and uv(t), after a number of IMU samples are available, for example, after 21 IMU samples are available. Prior to a time when these IMU samples are available, the source of IMU-based 6DoF poses 506 is the IMU integrator 406. In some implementations, to cope with this limitation, the neural network 920 can be trained to be robust in spite of missing information 1208. In particular, some implementations can bootstrap the batch filter with sequences of zeros for the first 15 samples of p(·) v(·), p(·) and v(·), during training and at inference time. In some implementations, this allows the neural network 920 to begin the inference as early as 0.5 seconds. Although the missing information 1208 during the first 15 inferences affects the quality of the neural network estimates, it can be observed that this does not translate into a larger estimation error. On the contrary in some implementations, the estimation error decreases. In some implementations, this is because a faster initialization time reduces the time the IMU integrator 406 is running without a correction from the neural network 920, thus reducing the total drift.

In some implementations, the initial velocity is assumed to be zero. Accordingly, v(·) is set to zero, for example, for the first 15 data samples. In some implementations, the initial velocity is not assumed to be zero, that is, the device may already be moving at time t=0. When the first 15 samples of v(·) are not set to zero, the neural network 920 expects a correct estimate for the initial velocity v(0) and may not learn how to correct the initial velocity if it is wrong. In some implementations, by setting v(·) to zero for the first 15 data samples during training, the neural network 920 is forced to recognize this as a particular state of its execution, e.g. an initialization period, during which the neural network 1000 does not trust the first velocity estimates. In some implementations, the neural network 920 will automatically learn how to infer the initial velocity without extra assistance.

In some implementations, the translational velocity of the headset is not measurable by the IMU 150. Instead, accelerations and angular velocities are measured. In some implementations, the neural network 920 infers an initial velocity from the measured motion patterns.

In some implementations, the neural network 920 is trained using, as training loss, an average Euclidean distance for both position and velocity:

$$\sum_t \|p(t) - \hat{p}(t)\|_2 + 0.2 \cdot \|v(t) - \hat{v}(t)\|_2 \qquad (6)$$

wherein ^denotes the ground truth quantities.

In some implementations, if the network confidence is trained at the same time as the correction up(·) and uv(·) the negative log-likelihood of a Gaussian can be used, for example, $$E[-\log \mathcal{N}(p(t),c(t))(\hat{p}(t))] \quad (7)$$

wherein c(t) is a confidence level of the estimate p(t) at time t, encoded as a diagonal matrix. Eq.7 is equivalent to $$E\left[\frac{3}{2} \cdot \log(2 \cdot \pi) + \sum_i \log c_i(t) + \frac{1}{2} \cdot \sum_i \frac{(p_i(t) - \hat{p}_i(t))^2}{c_i(t)^2}\right] \quad (8)$$

Figure 13:
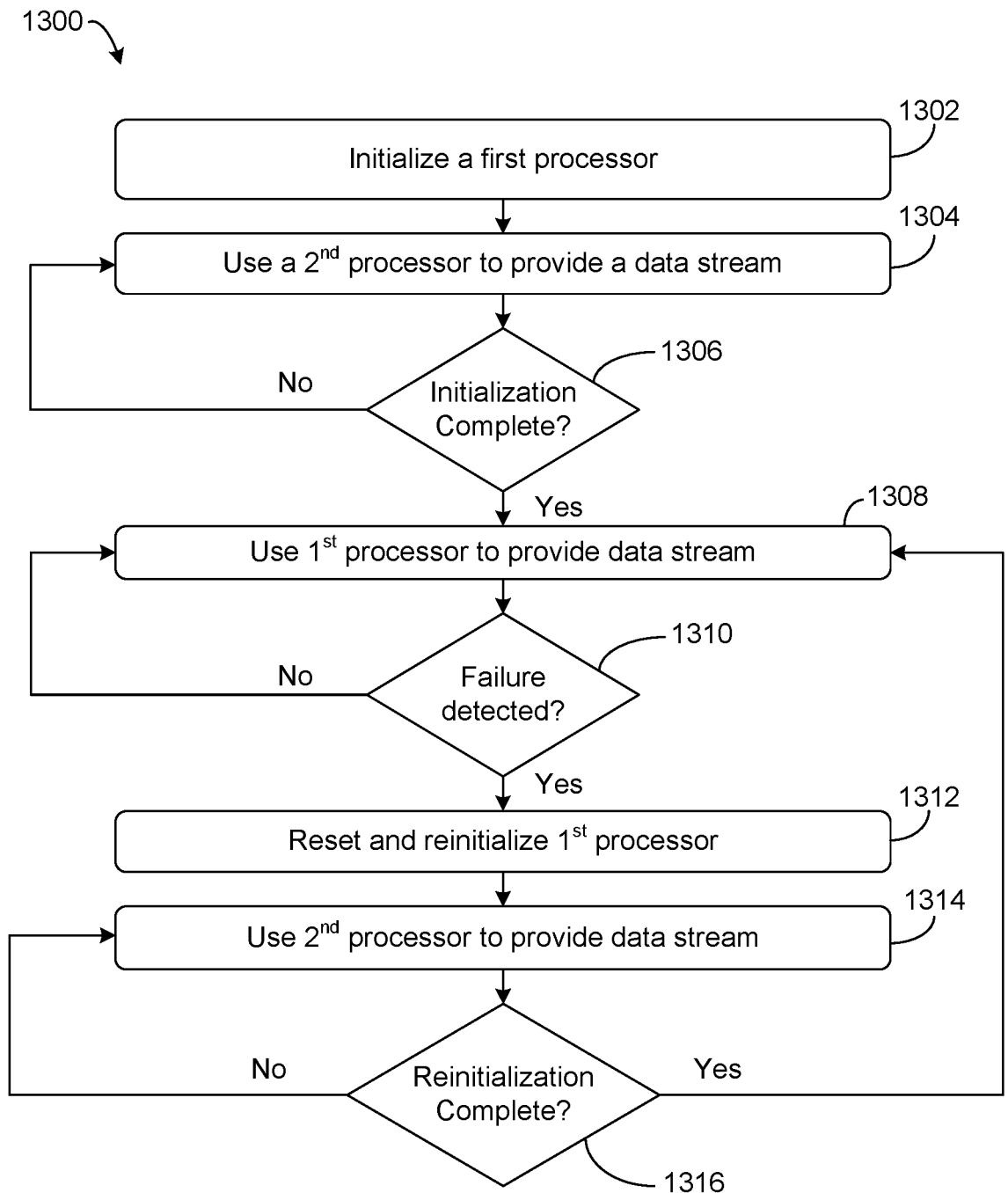
FIG. 13 is a flow chart for a method for providing a continuous data stream, according to a possible implementation of the present disclosure.

FIG. 13 illustrates a method 1300 for providing a continuous data stream, according to a possible implementation of the present disclosure. Operations of the method 1300 can be performed in a different order, or not performed, depending on specific applications. The method 1300 may be performed using the tracking system 200 shown in FIG. 2 and FIG. 4. In some implementations, the tracking system 200 is configured with the IMU-based 6DoF 208 as shown in FIG. 4. The method 1300 includes preliminary operations that occur prior to a reset event. Accordingly, it is understood that additional processes can be provided before, during, or after the method 1300, and that some of these additional processes may be briefly described herein.

The method 1300 includes, at 1302, initializing a first processor, as illustrated in FIG. 3A, according to a possible implementation of the present disclosure. In some implementations, the first processor is a mapping processor, e.g., the mapping algorithm 206, that is initialized during a first time interval T1 between t=0 and $t_i$, as shown in FIG. 3A. During the initialization period, the mapping algorithm 206 is not available to provide the data stream, e.g., the pose stream component 210.

The method 1300 further includes, at 1304, using a second processor to provide a first portion of the data stream during the first time interval T1, as illustrated in FIG. 3B, FIG. 5, and FIG. 6, according to a possible implementation of the present disclosure. In some implementations, the second processor is a measurement processor, e.g., the IMU-based 6DoF 208, The IMU-based 6DoF 208 transmits the 6DoF fallback pose stream component 212 to the fused pose provider 214 during the initialization period.

The method 1300 further includes, at 1306, determining whether or not the initialization is complete, according to a possible implementation of the present disclosure. The IMU-based 6DoF 208 continues to provide the 6DoF fallback pose stream component 212 throughout the time interval T1 until the mapping algorithm 206 is available again, at time $t_i$.

The method 1300 further includes, at 1308, switching to using the first processor to provide the data stream, as illustrated in FIGS. 3A and 3B, according to a possible implementation of the present disclosure. Following the initialization period, the fused pose provider 214 re-engages the mapping algorithm 206 to transmit the pose stream component 210, as a second portion, 210A of the data stream during a second time interval T2.

The method 1300 further includes, at 1310, determining whether or not a failure has occurred as illustrated in FIG. 3B and FIG. 4, according to a possible implementation of the present disclosure. The failure detector 412 monitors the output of the mapping algorithm 206 to detect when a failure occurs.

The method 1300 further includes, at 1312, resetting and reinitializing the first processor, as illustrated in FIG. 3B and FIG. 4, according to a possible implementation of the present disclosure. Upon detection of a failure, the failure detector 412 issues a reset command to the mapping algorithm 206, causing the mapping algorithm to reset. A re-initialization period follows the reset, during a time interval T3. In some implementations, a duration Δt of the re-initialization period can be in a range of about two to about four seconds, e.g., about 3 seconds.

The method 1300 further includes, at 1314, switching to using the second processor to provide the data stream, as illustrated in FIG. 3B, according to a possible implementation of the present disclosure. During the re-initialization period, the fused pose provider 214 engages the IMU-based 6DoF 208 to transmit the 6DoF fallback pose stream component 212.

The method 1300 further includes, at 1316, determining whether or not the reinitialization is complete, as illustrated in FIG. 3B and FIG. 4, according to a possible implementation of the present disclosure. The IMU-based 6DoF 208 continues to provide the 6DoF fallback pose stream component 212 throughout the time interval T3, until the mapping algorithm 206 is available again, following reinitialization. Following the re-initialization period, the fused pose provider 214 re-engages the mapping algorithm 206 to transmit the pose stream component 210, as a fourth portion, 210B of the data stream during a fourth time interval T4.

As shown in the figures and described above, the tracking system 200 is able to provide a continuous reset-free 6DoF pose, including the position and orientation of an AR headset to enable un-interrupted AR experiences. Features of the tracking system 200 can include the IMU-based 6DoF 208 as a parallel fallback-component to be used when the original tracking algorithm, e.g., the mapping algorithm 206 fails or is close to a failure. Features of the tracking system 200 can further include the IMU-based 6DoF 208 using the DeepIO network 408, a neural network that leverages a device's past motion to infer its future motion.

Another feature can include, during training, forcing the DeepIO network 408 to learn how to correct from its past mistakes, using a batch filtering approach for learning instead of simple supervised learning. In some implementations, this can avoid generating additional drift when these mistakes accumulate over time. Another feature can include incorporating prior knowledge into the network structure instead of learning from scratch. In some implementations, this can allow for a faster learning process, and a network that is at least about 20 times smaller than existing tracking systems. Another feature can include a system that includes but is not limited to one or multiple IMUs, one or multiple cameras and one of multiple processors for data.

A number of embodiments have been described herein. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Some of the above example embodiments are described as processes or methods depicted as flowcharts. Although the flowcharts describe the operations as sequential processes, many of the operations may be performed in parallel, concurrently, or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments are not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A system, comprising:
   a headset;
   a first processor configured to generate an image-based pose of the headset based on input from a camera and input from a motion sensor;
   a second processor communicatively coupled to the first processor and configured to generate a measurement-based pose of the headset based on the input from the motion sensor; and
   a pose provider configured to combine the image-based pose, from the first processor, with the measurement-based pose, from the second processor, by switching between the image-based pose and the measurement-based pose to produce a composite pose of the headset.

2. The system of claim 1, wherein the motion sensor is mounted on the headset.

3. The system of claim 1, wherein the second processor receives input data from the motion sensor.

4. The system of claim 1, further comprising a failure detector configured to cause the first processor to reset and begin a re-initialization process.

5. The system of claim 4, wherein, during the re-initialization process, the second processor supplies the measurement-based pose to provide a continuous experience to a user of the headset.

6. The system of claim 1, wherein the image-based pose and the measurement-based pose are generated asynchronously.

7. The system of claim 1, wherein the image-based pose and the measurement-based pose overlap in time.

8. The system of claim 1, wherein the pose provider is configured to transform the image-based pose and the measurement-based pose to a common coordinate frame.

9. An apparatus, comprising:
   an inertial measurement unit (IMU) integrator configured to receive measurement data from an IMU and generate a pose therefrom;
   a 3DoF filter configured to provide gravity corrections to the IMU integrator;
   a deep inertial odometry (DeepIO) network coupled to the IMU integrator, the DeepIO network configured to receive the pose and provide feedback to the IMU integrator; and
   a Kalman filter configured to filter an output of the DeepIO network.

10. The apparatus of claim 9, wherein the DeepIO network is a neural network.

11. The apparatus of claim 9, wherein the DeepIO network estimates a new pose based on the received pose.

12. The apparatus of claim 9, wherein the measurement data from the IMU includes IMU errors from at least one of bias, scale, axis misalignment, gyro-accelerometer misalignment, or noise.

13. The apparatus of claim 12, wherein at least one of the 3DoF filter or the Kalman filter are configured to reduce the IMU errors.

14. The apparatus of claim 9, wherein the IMU integrator and the DeepIO network cooperate in an iterative process.

15. The apparatus of claim 14, wherein the DeepIO network is configured to reduce growth of IMU errors during the iterative process.

16. A method, comprising:
   initializing a first processor;
   during the initializing, using a second processor to provide a first portion of a data stream during a first time interval;
   after the initializing, using the first processor to provide a second portion of the data stream during a second time interval;
   upon detecting a failure mode of the first processor, causing the first processor to begin a re-initialization process;
   using the second processor to provide a third portion of the data stream during the re-initialization process within a third time interval; and
   upon completion of the re-initialization process, using the first processor to provide a fourth portion of the data stream during a fourth time interval.

17. The method of claim 16, wherein detecting the failure mode causes the first processor to reset.

18. The method of claim 16, wherein when the second processor is used to provide the data stream, the second processor incorporates elements of the data stream previously provided by the first processor.

19. The method of claim 16, wherein the data stream provided by the first processor overlaps with the data stream provided by the second processor.

* * * * *